United States Patent
Coviello et al.

(10) Patent No.: US 9,715,902 B2
(45) Date of Patent: Jul. 25, 2017

(54) AUDIO-BASED ANNOTATION OF VIDEO

(71) Applicant: Amazon Technologies, Inc., Reno, NV (US)

(72) Inventors: Emanuele Coviello, San Diego, CA (US); Gert Lanckriet, San Diego, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/120,575

(22) Filed: Jun. 5, 2014

(65) Prior Publication Data

US 2014/0363138 A1     Dec. 11, 2014

Related U.S. Application Data

(60) Provisional application No. 61/956,354, filed on Jun. 6, 2013.

(51) Int. Cl.
| | |
|---|---|
| *H04N 9/80* | (2006.01) |
| *G11B 27/28* | (2006.01) |
| *H04N 21/439* | (2011.01) |
| *H04N 21/44* | (2011.01) |
| *H04N 21/84* | (2011.01) |
| *H04N 21/845* | (2011.01) |

(52) U.S. Cl.
CPC ......... *G11B 27/28* (2013.01); *H04N 21/4394* (2013.01); *H04N 21/44008* (2013.01); *H04N 21/84* (2013.01); *H04N 21/8456* (2013.01)

(58) Field of Classification Search
USPC .............................................. 386/239–248
See application file for complete search history.

(56) References Cited

U.S. PATENT DOCUMENTS

| | | |
|---|---|---|
| 6,711,293 B1 | 3/2004 | Lowe |
| 7,812,241 B2 | 10/2010 | Ellis |
| 8,112,418 B2 | 2/2012 | Barrington et al. |
| 8,135,221 B2 | 3/2012 | Jiang |
| 8,706,276 B2 | 4/2014 | Ellis et al. |

(Continued)

OTHER PUBLICATIONS

"A Bag of Systems Representation for Music Auto-Tagging" Katherine Ellis, Emanuele Coviello, Antoni B. Chan, and Gert Lanckriet, Senior Member, IEEE Transactions and Audio, Speech, and Language Processing, vol. 21, No. 12, Dec. 2013.

(Continued)

*Primary Examiner* — Hung Dang
(74) *Attorney, Agent, or Firm* — Hogan Lovells US LLP

(57) ABSTRACT

A technique for determining annotation items associated with video information is described. During this annotation technique, a content item that includes audio information and the video information is received. For example, a file may be downloaded from a uniform resource locator. Then, the audio information is extracted from the content item, and the audio information is analyzed to determine features or descriptors that characterize the audio information. Note that the features may be determined solely by analyzing the audio information or may be determined by subsequent further analysis of at least some of the video information based on the analysis of the audio information (i.e., sequential or cascaded analysis). Next, annotation items or tags associated with the video information are determined based on the features.

21 Claims, 6 Drawing Sheets

(56) References Cited

U.S. PATENT DOCUMENTS

| | | | | |
|---|---|---|---|---|
| 2003/0093790 | A1* | 5/2003 | Logan et al. | 725/38 |
| 2005/0286865 | A1* | 12/2005 | Dorai | H04N 5/783 386/248 |
| 2007/0293265 | A1* | 12/2007 | Fei | G06F 17/241 455/556.1 |
| 2008/0193016 | A1* | 8/2008 | Lim et al. | 382/190 |
| 2008/0235283 | A1* | 9/2008 | Turnball et al. | 707/104.1 |
| 2008/0276159 | A1* | 11/2008 | Narayanaswami | G06F 17/241 715/202 |
| 2012/0284749 | A1* | 11/2012 | Lee et al. | 725/39 |
| 2013/0121662 | A1* | 5/2013 | Moorer | H04N 21/4223 386/240 |
| 2015/0375117 | A1* | 12/2015 | Thompson | A63F 13/35 463/9 |

OTHER PUBLICATIONS

"Audio-Based Semantic Concept Classification for Consumer Video" Keansub Lee, Student Member, IEEE, and Daniel P. W. Ellis, Senior Member, IEEE Transactions on Audio, Speech, and Language Processing, vol. 18, No. 6, Aug. 2010.

"Subband Autocorrelation Features for Video Soundtrack Classification" Courtenay V. Cotton, Daniel P. W. Ellis LabROSA, Dept. of Electrical Engineering Columbia University (cvcotton,dpwe)@ee.columbia.edu.

Scheirer, Eric, and Malcolm Slaney. "Construction and evaluation of a robust multifeature speech/ music discriminator." In *Acoustics, Speech, and Signal Processing, 1997. ICASSP-97., 1997 IEEE International Conference on*, vol. 2, pp. 1331-1334. IEEE, 1997.

Williams, Gethin, and Daniel PW Ellis. "Speech/music discrimination based on posterior probability features." In *Eurospeech 99: 6th European Conference on Speech Communication and Technology*: Budapest, Hungary, Sep. 5-9, 1999. ESCA, 1999.

Logan, Beth. "Mel Frequency Cepstral Coefficients for Music Modeling." In *ISMIR*. 2000.

Tzanetakis, George, and Perry Cook. "Musical Genre Classification of Audio Signals." *Speech and Audio Processing, IEEE transactions on* 10, No. 5 (2002): 293-302.

McKinney, Martin F., and Jeroen Breebaart. "Features for audio and music classification." In *ISMIR*, vol. 3, pp. 151-158. 2003.

Berenzweig, Adam, Daniel PW Ellis, and Steve Lawrence. "Anchor space for classification and similarity measurement of music." In *Multimedia and Expo, 2003 International Conference on*, vol. 1, pp. 1-29. IEEE, 2003.

Mandel, Michael I., and Daniel PW Ellis. "Song-level features and support vector machines for music classification." In *ISMIR 2005: 6th International Conference on Music Information Retrieval: Proceedings: Variation 2: Queen Mary, University of London & Goldsmiths College, University of London*, Sep. 11-15, 2005, pp. 594-599. Queen Mary, University of London, 2005.

Bergstra, James, Norman Casagrande, Dumitru Erhan, Douglas Eck, and Balazs Kégl. "Aggregate features and AdaBoost for music classification." *Machine learning* 65, No. 23 (2006): 473484.

Ellis, Daniel PW. "Classifying music audio with timbral and chroma features." In *ISMIR 2007: Proceedings of the 8th International Conference on Music Information Retrieval*: Sep. 2327, 2007, Vienna, Austria , pp. 339340. Austrian Computer Society, 2007.

Cotton, Courtenay V., and Daniel PW Ellis. "Audio fingerprinting to identify multiple videos of an event." In *Acoustics Speech and Signal Processing (ICASSP), 2010 IEEE International Conference on* , pp. 23862389. IEEE, 2010.

Cotton, Courtenay V., and Daniel PW Ellis. "Spectral vs. spectrotemporal features for acoustic event detection." In *Applications of Signal Processing to Audio and Acoustics (WASPAA), 2011 IEEE Workshop on* , pp. 6972. IEEE, 2011.

Ellis, Daniel PW, Xiaohong Zeng, and Josh H. McDermott. "Classifying soundtracks with audio texture features." In *Acoustics, Speech and Signal Processing (ICASSP), 2011 IEEE International Conference on* , pp. 58805883. IEEE, 2011.

Hamel, Philippe, Yoshua Bengio, and Douglas Eck. "Building Musically-relevant Audio Features through Multiple Timescale Representations." In *ISMIR* , pp. 553558. 2012.

Dieleman, Sander, and Benjamin Schrauwen. "Multiscale Approaches to Music Audio Feature Learning." In *ISMIR* , pp. 38. 2013.

Vaizman, Y., McFee, B., Lanckriet, G.R.G.. "Codebook-Based Audio Feature Representation for Music Information Retrieval". IEEE/ACM Transactions on Audio, Speech and Language Processing (2014), vol. 22, pp. 14831493.

Ellis, Daniel PW, and Keansub Lee. "Features for segmenting and classifying long-duration recordings of personal audio." In *ISCA Tutorial and Research Workshop on Statistical and Perceptual Audio Processing*, Oct. 3, 2004, Jeju, Korea , pp. 16. International Symposium on Computer Architecture, 2004.

Doherty, Aiden R., Alan F. Smeaton, Keansub Lee, and Daniel PW Ellis."Multimodal segmentation of lifelog data." In *Large Scale Semantic Access to Content (Text, Image, Video, and Sound)* , pp. 2138. Le Centre de Hautes Etudes Internationales D'Informatique Documentaire, 2007.

Lee, Keansub, and Daniel PW Ellis. "Audio-based semantic concept classification for consumer video." *Audio, Speech, and Language Processing, IEEE Transactions on* 18, No. 6 (2010): 14061416.

Lee, Keansub, Daniel PW Ellis, and Alexander C. Loui. "Detecting local semantic concepts in environmental sounds using markov model based clustering." In *Acoustics Speech and Signal Processing (ICASSP), 2010 IEEE International Conference on* , pp. 22782281. IEEE, 2010.

Cotton, Courtenay V., Daniel PW Ellis, and Alexander C. Loui. "Soundtrack classification by transient events." In *Acoustics, Speech and Signal Processing (ICASSP), 2011 IEEE International Conference on* , pp. 473476. IEEE, 2011.

Mertens, Robert, Howard Lei, Luke Gottlieb, Gerald Friedland, and Ajay Divakaran. "Acoustic super models for large scale video event detection." In *Proceedings of the 2011 joint ACM workshop on Modeling and representing events* , pp. 1924. ACM, 2011.

Larson, Martha, Mohammad Soleymani, Pavel Serdyukov, Stevan Rudinac, Christian Wartena, Vanessa Murdock, Gerald Friedland, Roeland Ordelman, and Gareth JF Jones. "Automatic tagging and geotagging in video collections and communities." In *Proceedings of the 1st ACM international conference on multimedia retrieval*, p. 51. ACM, 2011.

Elizalde, Benjamin, Gerald Friedland, Howard Lei, and Ajay Divakaran. "There is no data like less data: Percepts for video concept detection on consumer-produced media." In *Proceedings of the 2012 ACM international workshop on Audio and multimedia methods for large-scale video analysis* , pp. 2732. ACM, 2012.

Jin, Qin, Peter Franz Schulam, Shourabh Rawat, Susanne Burger, Duo Ding, and Florian Metze. "Event-based Video Retrieval Using Audio." In *Interspeech* . 2012.

Ding, Duo, Florian Metze, Shourabh Rawat, Peter Franz Schulam, Susanne Burger, Ehsan Younessian, Lei Bao, Michael G. Christel, and Alexander Hauptmann. "Beyond audio and video retrieval: towards multimedia summarization." In *Proceedings of the 2nd ACM International Conference on Multimedia Retrieval*, p. 2. ACM, 2012.

Burger, Susanne, Qin Jin, Peter F. Schulam, and Florian Metze. "Noisemes: Manual annotation of environmental noise in audio streams." *submission to Interspeech* (2012).

Ding, Duo, Florian Metze, Shourabh Rawat, Peter F. Schulam, and Susanne Burger. "Generating natural language summaries for multimedia." In *Proceedings of the Seventh International Natural Language Generation Conference* , pp. 128130. Association for Computational Linguistics, 2012.

Ellis, Daniel PW, and Courtenay V. Cotton. "Subband Autocorrelation Features for Video Soundtrack Classification." In *The 38th International Conference on Acoustics, Speech, and Signal Processing* . 2013.

Rawat, Shourabh, Peter F. Schulam, Susanne Burger, Duo Ding, Yipei Wang, and Florian Metze. "Robust audio-codebooks for large-scale event detection in consumer videos." In *Interspeech* , pp. 29292933. 2013.

(56) References Cited

OTHER PUBLICATIONS

Metze, Florian, Shourabh Rawat, and Yipei Wang. "Improved audio features for large-scale multimedia event detection." In *Multimedia and Expo (ICME), 2014 IEEE International Conference on*, pp. 16. IEEE, 2014.
Carneiro, Gustavo, Antoni B. Chan, Pedro J. Moreno, and Nuno Vasconcelos. "Supervised learning of semantic classes for image annotation and retrieval." *Pattern Analysis and Machine Intelligence, IEEE Transactions on* 29, No. 3 (2007): 394410.
Turnbull, Douglas, Luke Barrington, David Torres, and Gert Lanckriet. "Semantic annotation and retrieval of music and sound effects." *Audio, Speech, and Language Processing, IEEE Transactions on* 16, No. 2 (2008): 467476.
Dieleman, Sander, Philémon Brakel, and Benjamin Schrauwen. "Audio-based music classification with a pretrained convolutional network." In *12th International Society for Music Information Retrieval Conference (ISMIR—2011)*, pp. 669674. University of Miami, 2011.
Weston, Jason Samy Bengio, and Nicolas Usunier. "Wsabie: Scaling up to large vocabulary image annotation." In *IJCAI*, vol. 11, pp. 27642770. 2011.
Weston, Jason, Samy Bengio, and Philippe Hamel. "Multitasking with joint semantic spaces for large-scale music annotation and retrieval." *Journal of New Music Research* 40, No. 4 (2011): 337348.
Weston, Jason, Samy Bengio, and Phillippe Hamel, "Large-scale music annotation and retrieval: Learning to rank in joint semantic spaces." *arXiv*:1105.5196 (2011).
Van den Oord, Aaron, Sander Dieleman, and Benjamin Schrauwen "Deep content-based music recommendation." In *Advances in Neural Information Processing Systems*, pp. 26432651. 2013.
Berenzweig, Adam, Daniel PW Ellis, and Steve Lawrence. "Anchor space for classification and similarity measurement of music." In *Multimedia and Expo, 2003. ICME'03. Proceedings. 2003 International Conference on*, vol. 1, pp. I29. IEEE, 2003.
Ness, Steven R., Anthony Theocharis, George Tzanetakis, and Luis Gustavo Martins. "Improving automatic music tag annotation using stacked generalization of probabilistic svm outputs." In *Proceedings of the 17th ACM international conference on Multimedia*, pp. 705708. ACM, 2009.
Hamel, Philippe, and Douglas Eck. "Learning Features from Music Audio with Deep Belief Networks." In *ISMIR*, pp. 339344. 2010.
Shalit, Uri, Daphna Weinshall, and Gal Chechik. "Online learning in the manifold of low-rank matrices." In *Advances in neural information processing systems*, pp. 21282136. 2010.
Xie, Bo, Wei Bian, Dacheng Tao, and Parag Chordia. "Music Tagging with Regularized Logistic Regression." In *ISMIR*, pp. 711716. 2011.
McFee, Brian, and Gert RG Lanckriet. "Large-scale music similarity search with spatial trees." In *ISMIR*, pp. 5560. 2011.
Hamel, Philippe, Simon Lemieux, Yoshua Bengio, and Douglas Eck. "Temporal Pooling and Multiscale Learning for Automatic Annotation and Ranking of Music Audio." In *ISMIR*, pp. 729734. 2011.
Coviello, Emanuele, Antoni B. Chan, and Gert Lanckriet. "Time series models for semantic music annotation." *Audio, Speech, and Language Processing, IEEE Transactions on* 19, No. 5 (2011): 1343-1359.
Ellis, Katherine, Emanuele Coviello, and Gert RG Lanckriet. "Semantic Annotation and Retrieval of Music using a Bag of Systems Representation." In *ISMIR*, pp. 723728. 2011.
Coviello, Emanuele, Adeel Mumtaz, Antoni B. Chan, and Gert RG Lanckriet. "Growing a bag of systems tree for fast and accurate classification." *In Computer Vision and Pattern Recognition (CVPR), 2012 IEEE Conference on*, pp. 1979-1986. IEEE, 2012.
Miotto, Riccardo, and Gert Lanckriet "A generative context model for semantic music annotation and retrieval." *Audio, Speech, and Language Processing, IEEE Transactions on* 20, No. 4 (2012): 10961108.

Murntaz, Adee, Emanuele Coviello, Gert RG Lanckriet, and Antoni B. Chan. "Clustering dynamic textures with the hierarchical em algorithm for modeling video." *Pattern Analysis and Machine Intelligence, IEEE Transactions on* 35, No. 7 (2013): 10061621.
Coviello, Emanuele, Adeel Mumtaz, Antoni Chan, and Gert Lanckriet. "That was fast! Speeding up NN search of high dimensional distributions." In *Proceedings of the 30th International Conference on Machine Learning (ICML-13)*, pp. 468-476. 2013.
K. Ellis, E. Coviello, A. Chan and G. Lanckriet. "A Bag of Systems Representation for Music Auto-tagging" IEEE Transactions on Audio, Speech and Language Processing, 2119, pp. 2554 2569, Dec. 2013.
Coviello, Emanuele, Antoni B. Chan, and Gert RG Lanckriet. "v." *The Journal of Machine Learning Research* 15, No. 1 (2014): 697747.
McFee, Brian, and Gert R. Lanckriet. "Metric learning to rank." In *Proceedings of the 27th International Conference on Machine Learning (ICML-10)*, pp. 775782. 2010.
McFee, Brian, Luke Barrington, and Gert RG Lanckriet. "Learning Similarity from Collaborative Filters." In *ISMIR*, pp. 345350. 2010.
McFee, Brian, Luke Barrington, and Gert Lanckriet. "Learning content similarity for music recommendation." *Audio, Speech, and Language Processing, IEEE Transactions on* 20, No. 8 (2012): 22072218.
Lim, Daryl, Gert Lanckriet, and Brian McFee. "Robust structural metric learning." In *Proceedings of the 30th International Conference on Machine Learning*, pp. 615623. 2013.
Rasiwasia, Nikhil, Jose Costa Pereira, Emanuele Coviello, Gabriel Doyle, Gert RG Lanckriet, Roger Levy, and Nuno Vasconcelos. "A new approach to cross-modal multimedia retrieval." In *Proceedings of the international conference on Multimedia*, pp. 251260. ACM, 2010.
Coviello, Emanuele, Riccardo Miotto, and Gert RG Lanckriet. "Combining Content-Based Auto-Taggers with Decision-Fusion." In *ISMIR*, pp. 705710.
Costa Pereira, Jose, Emanuele Coviello, Gabriel Doyle, Nikhil Rasiwasia, Gert Lanckriet, Roger Levy, and Nuno Vasconcelos. "On the role of correlation and abstraction in cross-modal multimedia retrieval." (2014): 11.
Foote, Jonathan. "Automatic audio segmentation using a measure of audio novelty." In *Multimedia and Expo, 2000. ICME 2000. 2000 IEEE International Conference on*, vol. 1, pp. 452455. IEEE, 2000.
Sundaram, Hari, and Shih-Fu Chang. "Video scene segmentation using video and audio features." In *Multimedia and Expo, 2000. ICME 2000. 2000 IEEE International Conference on*, vol. 2, pp. 11451148. IEEE, 2000.
Zhang, Tong, and C-CJ Kuo. "Audio content analysis for online audiovisual data segmentation and classification." *Speech and Audio Processing, IEEE Transactions on* 9, No. 4 (2001): 441457.
Lu, Lie, Stan Z. Li, and Hong-Jiang Zhang. "Content-based audio segmentation using support vector machines." In *Proceedings of the IEEE International Conference on Multimedia and Expo (ICME 2001)*, pp. 956959. 2001.
Tzanetakis, George, and Perry Cook. "Multifeature audio segmentation for browsing and annotation." In *Applications of Signal Processing to Audio and Acoustics, 1999 IEEE Workshop on*, pp. 103106. IEEE, 1999.
Barrington, Luke, Antoni B. Chan, and Gert Lanckriet. "Modeling music as a dynamic texture." *Audio, Speech, and Language Processing, IEEE Transactions on* 18, No. 3 (2010): 602612.
Liu, Jingen, Jiebo Luo, and Mubarak Shah. "Recognizing realistic actions from videos "in the wild"." In *Computer Vision and Pattern Recognition, 2009. CVPR. 2009. IEEE Conference on*, pp. 19962003. IEEE, 2009.
Ekenel, Hazim Kemal, Tomas Semela, and Rainer Stiefelhagen. "Content-based video genre classification using multiple cues." In *Proceedings of the 3rd international workshop on Automated information extraction in media production*, pp. 2126. ACM, 2010.
Schuldt, Christian, Ivan Laptev, and Barbara Caputo. "Recognizing human actions: a local SVM approach." In *Pattern Recognition, 2004. ICPR 2004. Proceedings of the 17th International Conference on*, vol. 3, pp. 3236. IEEE, 2004.

(56) References Cited

OTHER PUBLICATIONS

Snoek, Cees GM, Marcel Worring, and Arnold WM Smeulders. "Early versus late fusion in semantic video analysis." In *Proceedings of the 13th annual Acm international conference on Multimedia*, pp. 399402. ACM, 2005.

Grauman, Kristen, and Trevor Darrell. "The pyramid match kernel: Discriminative classification with sets of image features." In *Computer Vision, 2005. ICCV 2005. Tenth IEEE International Conference on*, vol. 2, pp. 1458-1465. IEEE, 2005.

Dalal, Navneet, and Bill Triggs. "Histograms of Oriented gradients for human detection." In *Compuater Society Conference on*. vol. 1, pp. 886893. IEEE, 2005.

Laptev, Ivan. "On space-time interest points." *International Journal of Computer Vision* 64, No. 23 (2005): 107123.

Zhu, Qiang, MC. Yeh, Kwang-Ting Cheng, and Shai Avidan. "Fast human detection using a cascade of histograms of oriented gradients." In *Computer Vision and Pattern Recognition, 2006 IEEE Computer Society Conference on*, vol. 2, pp. 14911498. IEEE, 2006.

Lazebnik, Svetlana, Cordelia Schmid, and Jean Ponce. "Beyond bags of features: Spatial pyramid matching for recognizing natural scene categories." In *Computer Vision and Pattern Recognition, 2006 IEEE Computer Society Conference on*, vol. 2, pp. 21692178. IEEE, 2006.

Jiang, Yu-Gang, Chong-Wah Ngo, and Jun Yang. "Towards optimal bag-of-features for object categorization and semantic video retrieval." In *Proceedings of the 6th ACM international conference on Image and video retrieval*, pp. 494501. ACM, 2007.

Deng, Jia, Wei Dong, Richard Socher, Li-Jia Li, Kai Li, and Li Fei-Fei. "Imagenet: A large-scale hierarchical image database." In *Computer Vision and Pattern Recognition, 2009. CVPR 2009. IEEE Conference on*, pp. 248-255. IEEE, 2009.

Horn, Berthold K., and Brian G. Schunck. "Determining optical flow." In *1981 Technical Symposium East*, pp. 319331. International Society for Optics and Photonics, 1981.

Derpanis, Konstantinos G., and Richard P. Wildes. "Dynamic texture recognition based on distributions of spacetime oriented structure." In *Computer Vision and Pattern Recognition (CVPR), 2010 IEEE Conference on*, pp. 191198. IEEE, 2010.

Li, Li-Jia, Hao Su, Li Fei-Fei, and Eric P. Xing. "Object bank: A high-level image representation for scene classification & semantic feature sparsification." In *Advances in neural information processing systems*, pp. 13781386. 2010.

Derpanis, Konstantinos G., Mikhail Sizintsev, Kevin Cannons, and Richard P. Wildes. "Efficient action spotting based on a spacetime oriented structure representation." In *Computer Vision and Pattern Recognition (CVPR), 2010 IEEE Conference on*, pp. 19901997. IEEE, 2010.

Wang, Heng, Alexander Klaser, Cordelia Schmid, and Cheng-Lin Liu. "Action recognition by dense trajectories." In *Computer Vision and Pattern Recognition (CVPR), 2011 IEEE Conference on*, pp. 3169-3176. IEEE, 2011.

Natarajan, Pradeep, Shuang Wu, Shiv Vitaladevuni, Xiaodan Zhuang, Stavros Tsakalidis, Unsang Park, and Rohit Prasad. "Multimodal feature fusion for robust event detection in web videos." In *Computer Vision and Pattern Recognition (CVPR), 2012 IEEE Conference on*, pp. 12981305. IEEE, 2012.

Ziegler, Andrew, Eric Christiansen, David Kriegman, and Serge J. Belongie, "Locally uniform comparing image descriptor." In *Advances in Neural Information Processing Systems*. pp. 19. 2012.

Sadanand, Sreemanananth, and Jason J. Corso. "Action bank: A high-level representation of activity in video." In *Computer Vision and Pattern Recognition (CVPR), 2012 IEEE Conference on*, pp. 12341241. IEEE, 2012.

Wang, Heng, Alexander Kläser, Cordelia Schmid, and Cheng-Lin Liu. "Dense trajectories and motion boundary descriptors for action recognition." *International Journal of Computer Vision* 103, No. 1 (2013): 6079.

Ellis, Daniel PW, Courtenay V. Cotton, Tom Friedland, and Kris Esterson. "Methods, systems, and media for mobile audio event recognition." U.S. Appl. No. 13/624,532, filed Sep. 21, 2012.

\* cited by examiner

AUDIO-BASED ANNOTATION OF VIDEO

CROSS REFERENCE TO RELATED APPLICATION

This application claims priority under 35 U.S.C. §119(e) to U.S. Provisional Application Ser. No. 61/956,354, entitled "Audio-Based Annotation of Video," by Emanuele Coviello and Gert Lanckriet, filed on Jun. 6, 2013, the contents of which are herein incorporated by reference.

BACKGROUND

The present disclosure relates to a technique for classifying or annotating video information based on audio information.

Analyzing video information (such as a sequence of images that are encoded using a video format) can be time-consuming and expensive. For example, it can be difficult to classify the content in the video information. Moreover, analyzing video information can be computationally intense and it is often difficult to perform such computations efficiently.

Consequently, analysis of video information is often crude. For example, instead of analyzing the video information in a file to classify the content, many existing approaches determine annotation items or tags that describe the content based on a text description provided by a user that provided the file or a viewer of the file. Alternatively, instead of analyzing all the video information in a file, other existing approaches analyze individual images in the file to determine annotation items. However, because these existing approaches are either ad hoc or significantly sub-sample the video information, the determined annotation items are often incomplete or inaccurate.

SUMMARY

The disclosed embodiments relate to a computer system that determines annotation items associated with video information. During operation, the computer system receives a content item that includes audio information and the video information. Then, the computer system extracts the audio information from the content item. Moreover, the computer system analyzes the audio information to determine features that characterize the audio information. Next, the computer system determines annotation items associated with the video information based on the features.

Note that the annotation items may be determined without analyzing the video information to determine additional features that characterize the video information.

In some embodiments, the computer system receives a link to the content item, where receiving the content item involves downloading the content item from the link.

Moreover, the features may specify: time-domain information, frequency-domain information, spectral content, Mel frequency cepstral coefficients, Mel spectrum, cepstrum, chroma features, a spectral flux, a spectral flatness, a zero-crossing rate, an attack-time, a temporal increase, a temporal decrease, an effective duration, a temporal centroid, an energy modulation, a frequency modulation of an energy envelope, one or more auto-correlation coefficients, energy information (such as: global energy, harmonic energy, noise energy), a root-mean-square level, a bandwidth, a band-energy ratio, a delta spectrum magnitude, a pitch, a pitch strength, a spectral centroid, a spectral spread, a spectral skewness, a spectral kurtosis, a spectral slope, a spectral decrease, a spectral roll-off, a spectral variation, a fundamental frequency, noisiness, inharmonicity, a harmonic spectral deviation, an odd-to-even harmonic energy ratio, a harmonic tristimulus, a total loudness, a specific loudness, a relative specific loudness, a roughness, a sharpness, a spread, a spectral crest factor, temporal statistics (such as: the mean, variance, and/or deviation), and/or features based on gammatone filters. More generally, the features may be determined using an unsupervised learning technique. For example, the features may include absolute or relative counts of prototype acoustic patterns (such as codewords), where the prototype acoustic patterns are learned from possibly large amounts of unlabeled data using unsupervised learning techniques such as: deep belief nets, clustering, vector quantization, and/or wavelets.

Note that determining the annotation items may involve calculating weights for a set of pre-defined annotation items using the features as an input to one or more pre-determined supervised learning models that specify relationships between the features and the annotation items. Note that a given annotation item may be associated with at least one given pre-determined supervised learning model that is used to calculate at least a weight associated with the given annotation item. Furthermore, at least the one given pre-determined supervised learning model may be used to calculate weights associated with the given annotation item and other annotation items, and the computer system may combine the weights calculated by the one or more pre-determined supervised learning models to obtain the annotation items associated with the video information.

In some embodiments, the computer system identifies a temporal location in the video information based on the audio information. Moreover, the computer system may analyze the video information proximate to the temporal location to determine additional features that characterize the video information, and determining the annotation items associated with the video information may be further based on the additional features or on modified or new features derived by the combination of the additional features and the audio features.

In some embodiments, the computer system uses features that describe the interaction of individual users or groups of users with the content item and/or with other content items, and/or features that characterize individual users or groups of users.

Furthermore, the computer system may provide a recommendation for another content item (or multiple other content items) that includes additional audio information and additional video information based on the determined annotation items. Alternatively or additionally, the computer system may provide a rating of the content item based on the determined annotation items. This rating may indicate: an estimated popularity of the content item, quality of the audio information, quality of the video information, and/or quality of the content item. Note that the recommendation and/or the rating may be determined and/or provided separately for the content item and/or the audio information and the video information.

In some embodiments, the computer system identifies music in the audio information. Furthermore, the computer system may identify (or provides a confidence on) whether, for a given content item, the audio information was dubbed over the visual information. Additionally, the computer system may provide a recommendation for at least one or more content items that include additional audio (visual) information to combine with the visual (audio) information of a given content item or of a segment of a content item.

Alternatively or additionally, the computer system may recommend at least one or more specific segments of a content item (instead of the entire content item).

In some embodiments, the computer system divides the audio information into segments, where a given segment has associated annotation items, and where at least some of the annotation items associated with the different segments are different from each other. Moreover, sets of annotation items may be separately determined for the segments using the one or more pre-determined supervised learning models, and the computer system may combine the sets of annotation items for the segments to obtain the annotation items for the video information and/or for the content item.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for determining annotation items associated with video information, and a computer-program product (e.g., software) for use with the computer system are described. During this annotation technique, a content item that includes audio information and the video information is received. For example, a file may be downloaded from a uniform resource locator. Then, the audio information is extracted from the content item, and the audio information is analyzed to determine features or descriptors that characterize the audio information. Note that the features may be determined solely by analyzing the audio information or may be determined by subsequent further analysis of at least some of the video information based on the analysis of the audio information (i.e., sequential or cascaded analysis). Next, annotation items or tags associated with the video information are determined based on the features.

By annotating the video information using the audio information, the annotation technique may improve the accuracy of the determined annotation items relative to existing annotation techniques, and thus may provide a better description of the content item. This improved classification may, in turn, improve the user experience when viewing or perusing content items. For example, the determined annotation items may allow users to better determine if the content item is of interest. Moreover, a provider of a service that includes the content item can provide a rating of the content item based on the determined annotation items. In addition, the provider may provide recommendations to a user based on the determined annotation items and/or the user's predefined or predetermined preferences. Consequently, the annotation technique can increase user satisfaction and, thus, may increase the revenue of the provider of the service and/or the provider of the annotation technique. Furthermore, the annotation technique may allow the video information to be annotated in less time and with less expense than the existing annotation techniques, which may increase the profit of the provider of the service and/or the provider of the annotation technique. Based on the determined annotation items, in some embodiments a provider identifies audio or visual information from one or more portions of one or more content items to merge or combine with the visual or audio information of a given content item to create a new content item of higher quality.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
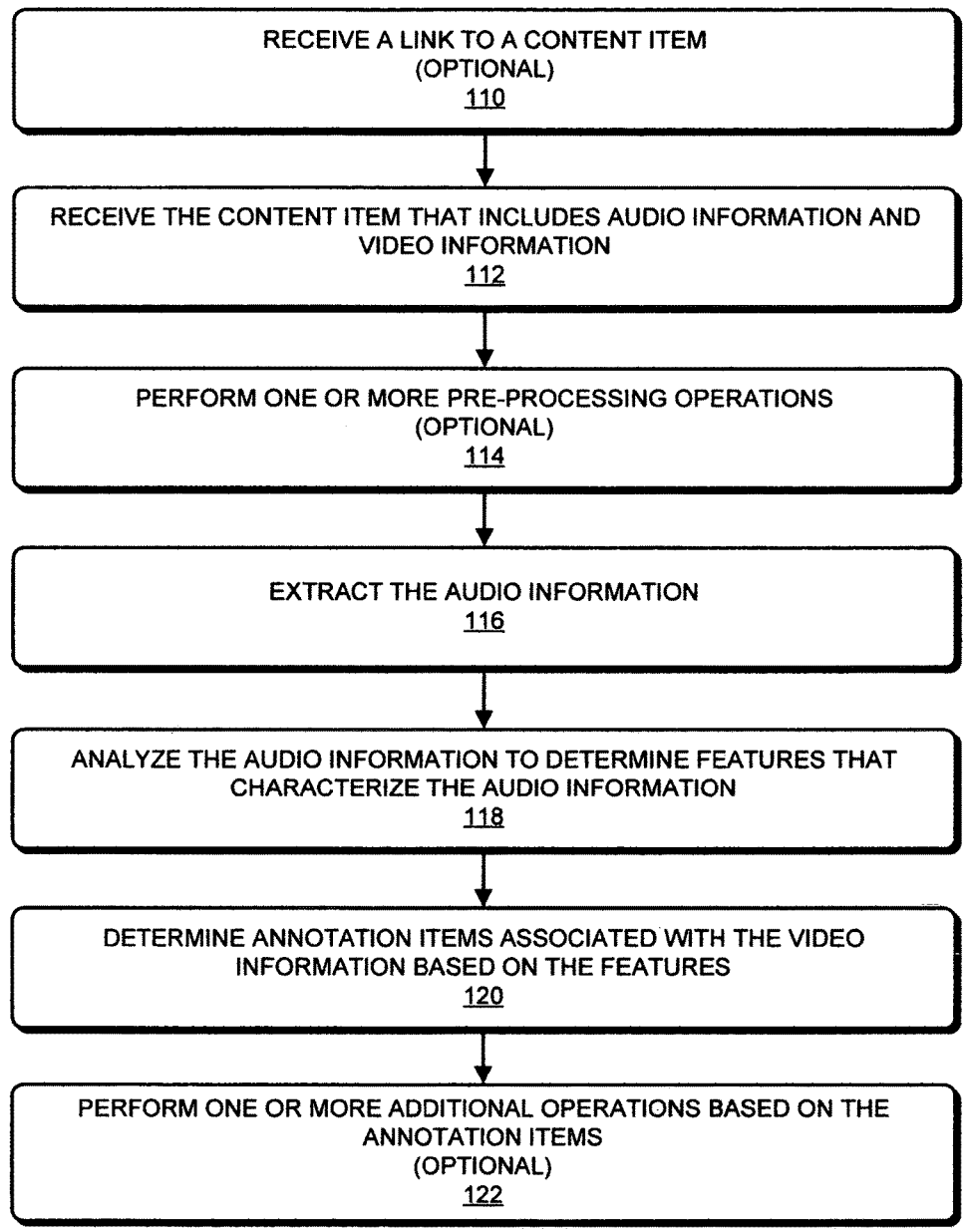
FIG. 1 is a flow chart illustrating a method for determining annotation items associated with video information in accordance with an embodiment of the present disclosure.

We now describe embodiments of the annotation technique. FIG. 1 presents a flow chart illustrating a method 100 for determining annotation items associated with video information, which may be performed by a computer system (such as computer system 400 in FIG. 4). During operation, the computer system receives a content item that includes audio information and the video information (operation 112). For example, the content item may include: files (such as audio, video, music, word-processor or data files), types of content or data having one or more formats, folders or containers that include multiple files or types of content, a link to a file or a folder (such as a uniform resource locator or URL), etc. Note that the audio information may include a signal corresponding to sound in an audible band of frequencies (such as 15 Hz to 22,050 or 24,000 Hz) that is encoded using an audio format (such as MP3, MP4, audio video interleave, flash, etc.) and the video information may include a sequence of images that are encoded using a video format (such as MPEG, audio video interleave, flash, etc.).

Note that before receiving the content item (operation 112), in some embodiments the computer system first optionally receives a link to the content item (operation 110), where receiving the content item involves downloading the content item from the link. However, in some embodiments receiving the content item involves accessing the content item in a computer-readable memory (which may be local or remotely located from the computer system).

Then, the computer system extracts the audio information from the content item (operation 116).

Moreover, the computer system analyzes the audio information to determine features that characterize the audio information (operation 118). Note that the features may specify: time-domain information, frequency-domain information, spectral content, Mel frequency cepstral coefficients, Mel spectrum, cepstrum, chroma features, a spectral flux, a spectral flatness, a zero-crossing rate, an attack-time, a temporal increase, a temporal decrease, an effective duration, a temporal centroid, an energy modulation, a frequency modulation of an energy envelope, one or more auto-correlation coefficients, energy information (such as: global energy, harmonic energy, noise energy), a root-mean-square level, a bandwidth, a band-energy ratio, a delta spectrum magnitude, a pitch, a pitch strength, a spectral centroid, a spectral spread, a spectral skewness, a spectral kurtosis, a spectral slope, a spectral decrease, a spectral roll-off, a spectral variation, a fundamental frequency, noisiness, inharmonicity, a harmonic spectral deviation, an odd-to-even harmonic energy ratio, a harmonic tristimulus, a total loudness, a specific loudness, a relative specific loudness, a roughness, a sharpness, a spread, a spectral crest factor, temporal statistics (such as: the mean, variance, and/or deviation), and/or features based on gammatone filters. More generally, the features may be determined using an unsupervised learning technique. For example, the features may include absolute or relative counts of prototype acoustic patterns (such as codewords), where the prototype acoustic patterns are learned from possibly large amounts of unlabeled data using unsupervised learning techniques such as: deep belief nets, clustering, vector quantization, and/or wavelets.

In some embodiments, the features include first, second and/or higher order instantaneous derivatives of one or more of the preceding specified information. Alternatively or additionally, the features may be determined using a pooling function over sets of several features extracted at different temporal locations of the audio information, where the pooling function can be, but is not restricted to: maximum, minimum, variance, standard deviation, mean, higher order moments, higher order centered moments, median, (1−x)·100 percentiles (where x is a percentile, an order statistic and/or more generally any summary statistic related to the value of any given feature), and/or integrals over the sets of features. Other embodiments may include a bag of features and/or a permutation feature computed from one or more of the preceding specified information and features. For example, given a spectral feature that represents the energy of the audio information in different frequency bands, a permutation feature may be computed by sorting the frequency bands based on their energy, and using the result of ranking the frequency bands as the permutation feature. Furthermore, statistical models computed from one or more of the preceding specified information and features may be used as features. In this case, given a set of features for a content item that are computed at the same and/or different temporal locations in the audio information, the audio information may be represented using a statistical model that describes the shape of the distribution of the set of features. Additionally, the features may include one or more sets of weights, derived from one or more of the preceding specified information, features and statistical models for the audio information in one or more content items. For example, cleaner and more robust prediction/annotation for a content item can be produced by modeling the co-occurrences/correlations of annotation items for several content items. In particular, given a new content item and set of statistical models representing a predefined set of annotations items (e.g., rock, pop, guitar, loud, laughing, screaming, etc.), the audio information in the new content item can be represented by a set of weights for the predefined set of annotation items. This set of weights may represent a high-level feature that can subsequently be used in a second stage of statistical modeling of the predefined set of annotation items. In some embodiments, features derived by automatic recognition of speech and/or speakers from the audio information or from other features that characterize the audio information may be used in the annotation technique.

Note that the annotation items may be determined without analyzing the video information to determine additional features that characterize the video information. For example, the additional features may be determined by analyzing usage patterns of the content item and other content items. However, in some embodiments the audio information and the video information are sequentially analyzed to determine the annotation items. For example, the annotation items determined by analyzing the audio content may then be used as inputs or starting points in the analysis of the video information (i.e., cascaded analysis may be performed). Note that such analysis of the video information may include one or more video-analysis techniques such as: optical flow, a bag of systems representation, probabilistic kernels for the classification of autoregressive visual processes, a mixture of dynamic textures, a histogram of oriented gradients, clouds of space-time interest points, mined hierarchical compound features, boosting efficient motion features, pyramid of histogram of gradients, scale-invariant feature transform, color histograms, bag of visual words representation, scene classification, text detection, face recognition and/or object recognition. Alternatively, as described further below, the audio information may be used to identify one or more temporal locations in the video information that are of interest. Then, the video information proximate to the one or more temporal locations may be analyzed to determine optional additional features that characterize the video information. Note that, for a content item where the audio information is absent or known to be of no interest, the annotation items may be determined by solely analyzing features that characterize the video information. Other embodiments may use features that describe the interaction of individual users or groups of users with the content item and/or with other content items, and/or features that characterize individual users or groups of users. Moreover, the computer system may use features based on captions associated to the content item, or metadata associated to the content item (e.g., title, author, specification of the capture device, location, time, etc.)

Next, the computer system determines annotation items associated with the video information based on the features (operation 120) or on modified or new features derived by the combination of the additional features and the audio features. In some embodiments, determining the annotation items involves calculating weights for a set of predefined annotation items using the features as an input to one or more predetermined supervised learning models that specify relationships between the features and the annotation items. Note that a given annotation item may be associated with at least one given predetermined supervised learning model that is used to calculate at least a weight associated with the given annotation item. For example, there may be more than one given pre-determined supervised learning model associated with a given annotation item (e.g., a support vector machine to predict 'adult content' and a Gaussian mixture model to predict 'adult content'). Furthermore, the at least one given pre-determined supervised learning model may be used to calculate weights associated with the given annotation item and other annotation items, the computer system may combine the weights calculated by the one or more predetermined supervised learning models to obtain the annotation items associated with the video information. (In embodiments where there are multiple pre-determined supervised learning models associated with a given annotation item, the weights calculated using these pre-determined supervised learning models may be combined to make a final prediction for the given annotation item.) Additionally, in some embodiments the optional additional features that characterize the video information are used when determining the annotation items associated with the audio information and/or the content item.

In some embodiments, the computer system performs one or more optional additional operations based on the features and/or the annotation items (operations 122) (or the weights associated with the annotation items so that the determined annotation items are not limited to presence or absence). For example, the computer system may provide a recommendation for at least another content item that includes audio information and video information based on the determined annotation items for at least the content item. Furthermore, an overlap or similarity of the annotation items for the content item and the other content item may be used to make the recommendation. Alternatively or additionally, the computer system may provide a rating of the content item based on the determined annotation items. This rating may indicate: an estimated popularity of the content item (based on preexisting data about popular content items and their associated annotation items), quality of the audio information, quality of the video information, and/or quality of the content item. For example, classifiers may have previously been trained to predict: estimated popularity, good versus bad audio quality, good versus bad video quality and/or the quality of the content item in general. In particular, tag models may be trained for tags such as 'popular,' 'not popular,' 'good quality,' 'bad quality' and determining the annotation items may use these tags and, thus, may provide the rating based on the weights determined for these tags. Note that the recommendation and/or the rating may be determined and/or provided separately for the content item and/or the audio information and the video information.

In some embodiments performing the additional operations also encompasses the use of the features directly. Note that using the features directly (e.g., from the audio information and/or the video information) in the optional additional operations or after learning a transformation of the features may allow improved recommendations (e.g., using a metric learning technique). For example, for providing recommendations, the features can be used without performing tagging. In particular, the similarity between extracted features from the audio information or the video information (e.g., those determined in operation 118 or after a supervised-learning model learns a feature transformation) may be measured between a given content item and other content items that may be candidate recommendations.

In some embodiments, the one or more additional operations in operation 122 include (or provide a confidence on) whether, for a given content item, the audio information was dubbed over the visual information. Furthermore, the one or more additional operations in operation 122 may include: providing a recommendation for at least one or more content items that include additional audio (visual) information to combine with the visual (audio) information of a given content item, or of a segment of a content item; and/or providing a recommendation for at least one or more specific segments of a content item (instead of for the entire content item).

In some embodiments, the one or more additional operations in operation 122 include identifying music in the audio information. The identified music may be used to: provide song names and associated information (such as a performer name), identify copyrighted music, bill for use of copyrighted music, pay for use of copyrighted music, block content items that include copyrighted music, provide a link to a location where the copyrighted music can be purchased or downloaded, and/or identify speech in the audio information (which may facilitate subsequent speaker identification and/or speech recognition). Additionally, the one or more additional operations 122 may include identifying, based on the determined annotation items, audio (or visual) information from one or more portions of one or more content items to merge or combine with the visual (or audio) information of a given content item. This identified information may be used to create a modified or new content item of increased quality from the original given content item. Consequently, the annotation technique can increase user satisfaction and retention, and may increase the revenue of the provider of the service and/or the provider of the annotation technique.

In some embodiments, the computer system performs one or more optional pre-processing operations 114. For example, the computer system may divide the audio information (or the content item) into segments, where a given segment has associated annotation items, and where at least some of the annotation items associated with the different segments are different from each other. Moreover, sets of annotation items may be separately determined for the segments using the one or more pre-determined supervised learning models, and the computer system may combine the sets of annotation items for the segments to obtain the annotation items for the video information and/or for the content item.

Figure 2:
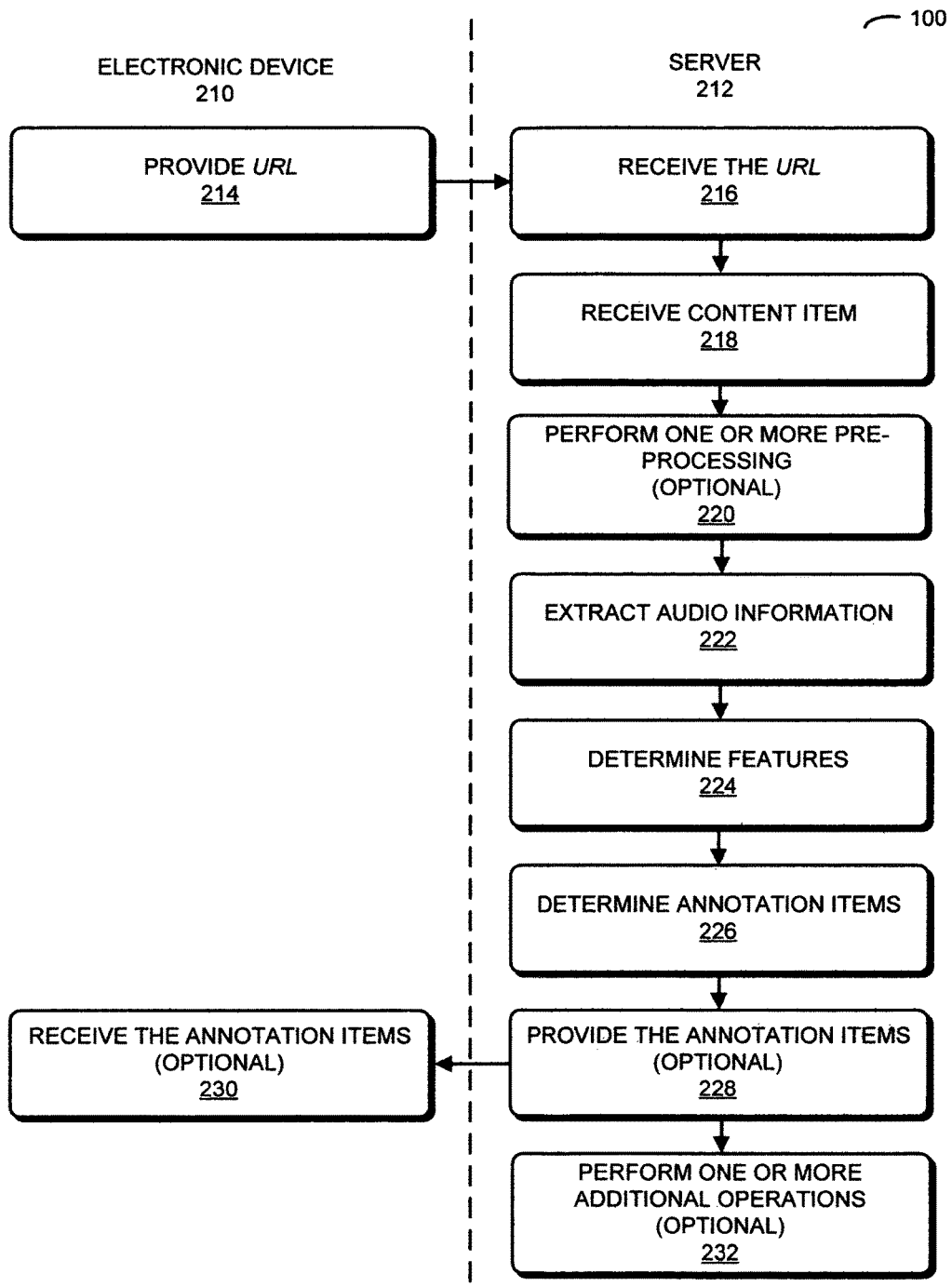
FIG. 2 is a flow chart illustrating the method of FIG. 1 in accordance with an embodiment of the present disclosure.

In an exemplary embodiment, the annotation technique is implemented using an electronic device (such as a computer or a portable electronic device, e.g., a cellular telephone) and a computer, which communicate through a network, such as a cellular-telephone network and/or the Internet (e.g., using a client-server architecture). This is illustrated in FIG. 2, which presents a flow chart illustrating method 100 (FIG. 1).

During the method, electronic device 210 may optionally provide (operation 214), and server 212 may optionally receive (operation 216) the URL to the content item that includes the audio information and the video information. Then, server 212 may receive the content item (operation 218). For example, server 212 may download the content item at the URL (which may be at the same or a different location than electronic device 210). Alternatively, server 212 may access the content item in a computer-readable memory.

Next, server 212 may extract the audio information (operation 222) and may determine the features (operation 224) that characterize the audio information by analyzing the audio information. Moreover, server 212 may determine annotation items (operation 226) associated with the video information based on the features. Server 212 may optionally provide (operation 228) and electronic device 210 may optionally receive (operation 230) the determined annotation items.

In some embodiments, server 212 optionally performs one or more pre-processing operations (operations 220), such as dividing the content item into segments. Alternatively or additionally, server 212 may optionally perform one or more additional operations (operation 232), such as providing a rating of the content item and/or a recommendation for another content item based on the determined annotation items and/or the extracted features.

In some embodiments of method 100 (FIGS. 1 and 2), there may be additional or fewer operations. For example, the analysis of the audio information may allow one or more temporal locations of interest in the video information to be identified and tagged, which may allow a user to easily peruse or view these one or more temporal locations of interest. Alternatively or additionally, determining the annotation items (operation 120) may involve merging or combining annotation items that were determined for segments of the video information.

Moreover, a user or a provider of the content may be allowed to add or customize their own dictionary of predefined tags or annotation items. This may involve a user or a provider providing 100-1000 example files or content items with audio information and/or video information for a particular annotation item (such as soccer). (Alternatively, the example files may be provided via links as opposed to directly.) Then, a classifier for this annotation item may be trained and subsequently used in the annotation technique. Thus, the user may indirectly provide features associated with a new annotation item that can be used to train a supervised learning model (i.e., the classifier) to model the relationship between the features and the new annotation item. (Alternatively, the user could directly provide the features and/or the supervised learning model instead of the example content items.) Note that the supervised learning model can then be used in the annotation technique to determine weights or values for the new annotation item based on features extracted from other content items.

In some embodiments, a user selects a subset of a predefined set of annotation items for use in determining annotation items for one or more provided content items. This predefined set of annotation items may include: a standard dictionary available for use with the annotation technique; public user-contributed annotation items (as described above), which may be available for use by other users; and/or private user-contributed annotation items (as described above), which only may be available for use by the user that provided them.

Furthermore, the order of the operations in method 100 (FIGS. 1 and 2) may be changed, and/or two or more operations may be combined into a single operation.

Figure 3:
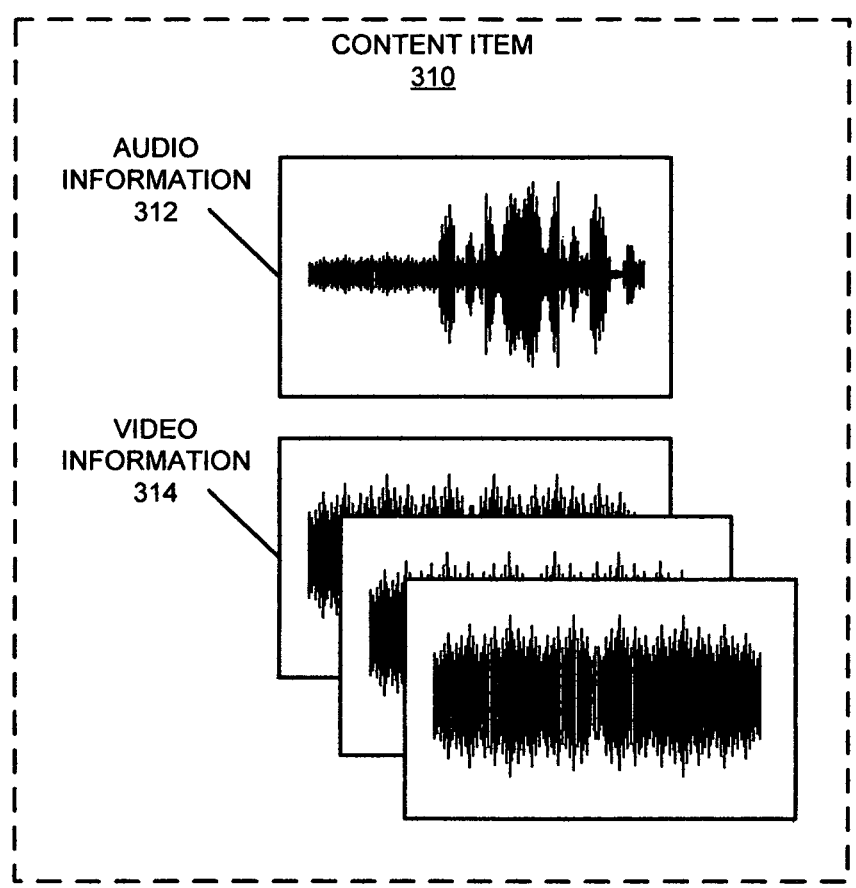
FIG. 3 is a drawing illustrating audio information and video information in a content item in accordance with an embodiment of the present disclosure.

In an exemplary embodiment, the annotation technique is used to determine annotation items for video information based on audio information. This is illustrated in FIG. 3, which presents a drawing illustrating audio information 312 and video information 314 in a content item 310. Note that video information 314 is a 'two-dimensional' wave-form (i.e., it is a time series of images, each of which is a matrix of pixels), while audio information 312 is effectively a 'zero-dimensional' wave-form (i.e., it is a time series of real-valued numbers, each of which is a simple scalar). Consequently, video information 314 is more difficult to process than audio information 312.

Content item 310 or a link to content item 310 may be received from a user of the annotation technique via a web-based interface or an application programming interface (e.g., a server can be called using instructions or commands provided to a command-line interface). For example, content item 310 may be directly uploaded to server 212 (FIG. 2) by the user (which may use an application programming interface provided by server 212). Alternatively, if a link to content item 310 is provided, content item 310 may be downloaded. For example, content item 310 embedded in a URL may be downloaded by calling a command line program, and content item 310 may be stored in a local folder or container. In an exemplary embodiment, the highest quality format of content item 310 available at the URL is downloaded. (However, in other embodiments a lower quality format is used if convenient.) Note that the link (such as the URL) may point to a web page that embeds one or more content items, or to a folder containing one or more content items (e.g., in an online content management system, such as a cloud-based storage system, or an ftp server).

Once content item 310 is received or is accessed, audio information 312 is extracted. In particular, another command-line program may be called to decode content item 310 (separating an audio stream and a video steam, i.e., audio information 312 and video information 314) and the audio stream may be successively resampled to 22,050 Hz and coded in an MP3 format, which is then stored in the local or a remote computer-readable storage medium (such as a folder or container) for subsequent processing.

Note that in some embodiments, instead of providing content item 310 (or a link to content item 310), the user may provide audio information 312 (or a link to audio information 312), i.e., the user may have already extracted audio information 312.

Next, descriptors or features are determined from audio information 312. These features may be used as inputs to one or more supervised learning models (or classifiers) that predict the relevance of annotation items in a predefined dictionary (or set of annotation items) to the features (and, thus, to video content 314 and, more generally, content item 310). For example, the one or more supervised learning models may include: a Gaussian mixture model, a dynamic texture mixture model, and/or a support vector machine (SVM), a Dirichlet mixture model, a hidden Markov mixture model, an artificial neural network, a deep belief network, a naive Bayes model, a logistic regression model, a nearest neighbor model, a boosting model, a non-parametric Bayesian method model, a decision tree, a Gaussian process, a kernel estimator, an autoregressive model, a random forest model, a kernel method model, an ensemble of classifiers, a cascading classifiers, a linear discriminant analysis model, a Fisher discriminant analysis model, a multi-label classification model, a multi-class classification model, and/or a one-class classification, perceptron. The one or more supervised learning models may return values for each annotation item in the predefined dictionary. For example, a matching vector may be provided with values for 50-200 annotation items, such as: hip hop, speech, moaning, sports, and adult content. A given value in the matching vector may indicate how likely a given annotation item is to be applicable to audio information 312 (and, thus, to video information 314 and content item 310). Note that in some embodiments there are different supervised learning models for each annotation item in the predefined dictionary, and the features may be used as inputs to these different supervised learning models multiple times in order to determine the values, which then may be assembled into the matching vector.

Alternatively, in some embodiments the different supervised learning models each provide a matching vector with values for the annotation items in the predefined dictionary, which are then merged into the matching vector (i.e., the values for the different annotation items in the different matching vectors provided by the different supervised learning models are merged into the matching vector). For example, a weighted summation of the annotation items (or, more specifically, the weighted summation of the values associated with the annotation items), maximum pooling (in which the value for a given annotation item is determined as the maximum value across the values for the given annotation item provided by the different supervised learning models), and/or another (i.e., a secondary-stage) supervised learning model (after this supervised learning model has been trained on such inputs and the corresponding outputs) may be used to combine the segment-level annotation values.

As noted previously, features and annotation items may be determined for the entire audio track associated with content item 310 or for individual segments. These segments may have a fixed length (such as 10, 15 or 20 s). Alternatively, the segment lengths (such as start and/or stop positions) may be iteratively modified or adjusted based on the associated features extracted from the segments to obtain homogeneous segments. Note that each fixed or variable-length segment may have an associated group of annotation items (which, in general, may be at least partially different for adjacent homogeneous segments) for those segments that have been annotated using the pre-determined supervised learning models. This approach may allow segments in audio information 312 with speaking versus segments without speaking or music versus without music to be identified. In some embodiments, the annotation items determined for different segments may be merged or aggregated to obtain a single (high-level) set of annotation items for audio information 312 (and, thus, for video information 314 and content item 310). Once again, this merge operation may involve a weighted summation of the annotation items, maximum pooling, and/or another (i.e., a secondary-stage) supervised learning model to combine the segment-level annotation values (after this supervised learning model has been trained on such inputs and the corresponding outputs).

While preceding embodiments illustrated the annotation technique using central processing of the content item, in other embodiments the annotation technique may be implemented as a program module or a software application that may be provided to third parties that do not wish to share content items or that do not want the content items stored in a local or remote computer-readable storage medium associated with a provider of the annotation technique. This program module may include instructions for extracting audio information 312, determining the features, and determining the annotation items for content item 310.

In a variation on this approach, the program module may include instructions for extracting audio information 312 and determining the features. These features may be provided to server 212 (FIG. 2), which uses them to determine the annotation items for associated content item 310. Then, the user may retrieve the determined annotation items using the web-based interface or the application programming interface.

Because the annotation technique may improve the quality of a video service offered by a provider, the provider may wish to have multiple content items classified using the annotation technique (i.e., the provider may want annotation items determined for multiple content items). Consequently, operations in the annotation technique may involve user action (such as the user providing commands or instructions via a command-line interface) or may be highly automated so that user action is not necessary. For example, the annotation technique may be performed automatically in response to a request or query for classification of content item 310 that is received from electronic device 210 (FIG. 2).

Figure 4:
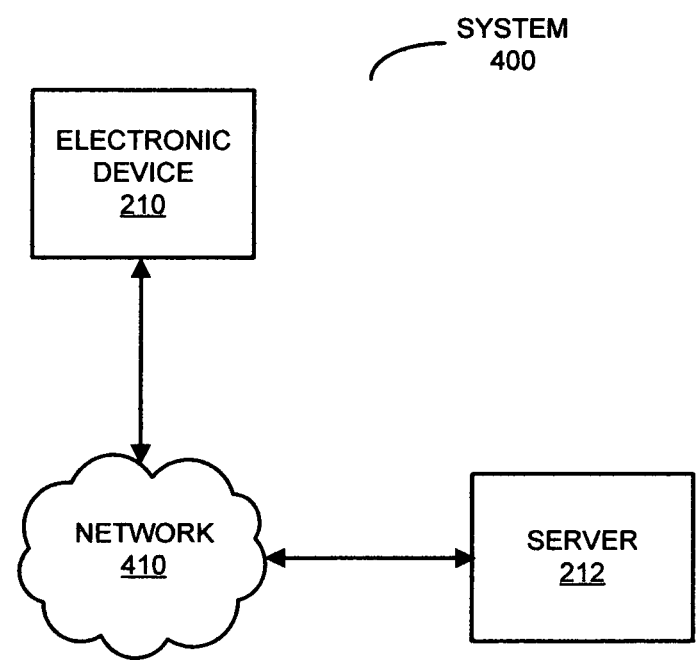
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the annotation technique a user of electronic device 210 may use a software product, such as a software application that is resident on and that executes on electronic device 210. (Alternatively, the user may interact with a web page that is provided by server 212 via network 410, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 212 or that is installed and which executes on electronic device 210).

During the annotation technique, the user may use the software application on electronic device 210 to provide the URL (or the content item) to server 212 via network 410. After receiving the URL, server 212 may download the content item at the URL via network 410.

Next, server 212 may extract the audio information from the content item and may determine the features that characterize the audio information by analyzing the audio information. Moreover, server 212 may determine the annotation items associated with the video information (and the content item) based on the features. Server 212 may optionally provide the determined annotation items to electronic device 210 via network 410. This may allow a provider of a service (such as an online video sharing website) to better classify the content item.

In some embodiments, server 212 optionally performs one or more pre-processing operations prior to extracting the audio information and/or determining the annotation items, such as dividing the content item into segments. Alternatively or additionally, server 212 may optionally perform one or more additional operations, such as providing, via network 410, a rating of the content item and/or a recommendation for another content item based on the determined annotation items and/or the extracted features.

Note that information in system 400 may be stored at one or more locations in system 400 (i.e., locally or remotely). Moreover, because this data may be sensitive in nature, it may be encrypted. For example, stored data and/or data communicated via network 410 may be encrypted.

Figure 5:
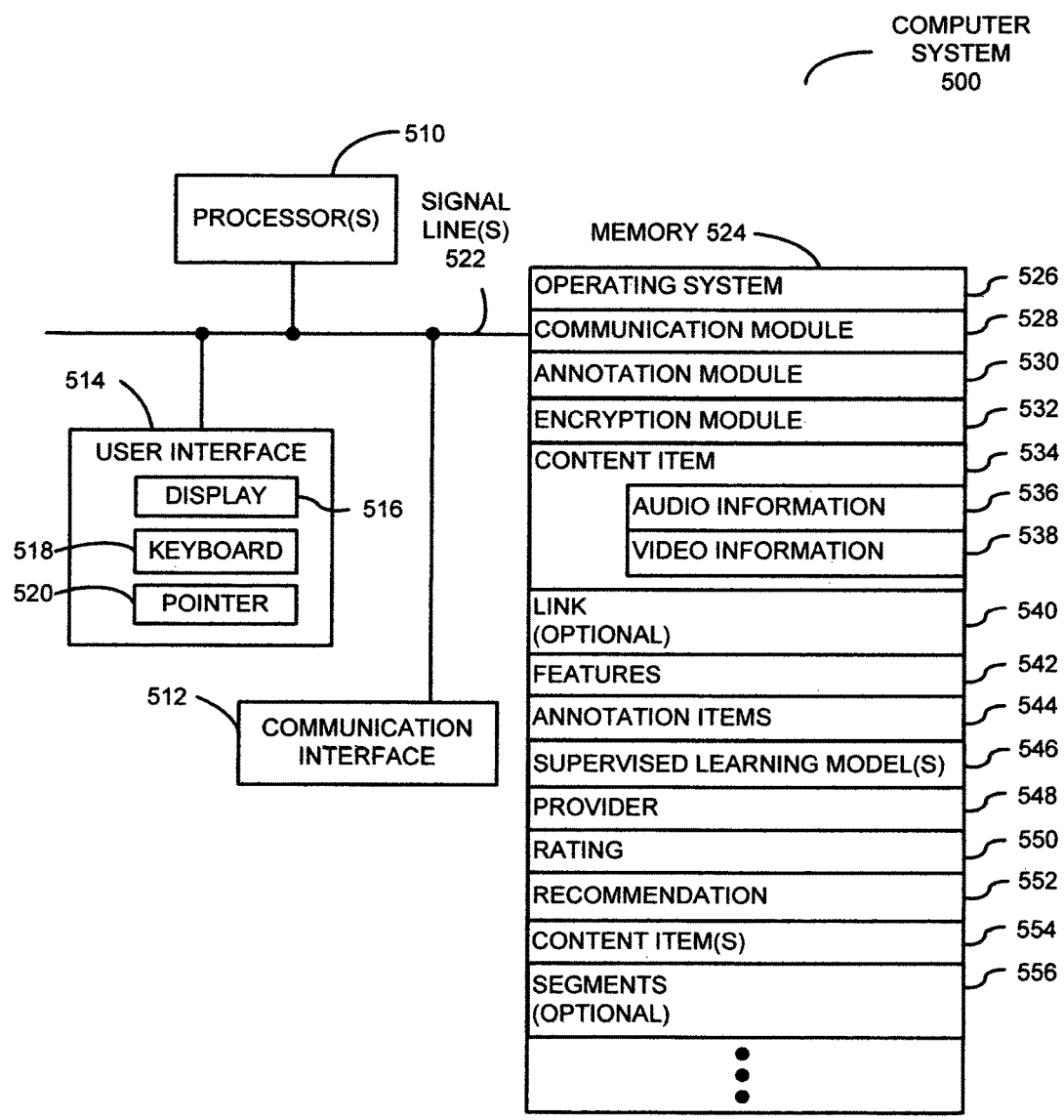
FIG. 5 is a block diagram illustrating a computer system that performs the method of FIGS. 1 and 2 in accordance with an, embodiment of the present disclosure.

FIG. 5 presents a block diagram illustrating a computer system 500 that performs method 100 (FIGS. 1 and 2), such as server 212 (FIGS. 2 and 4). Computer system 500 includes one or more processing' units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: annotation module 530 (or a set of instructions) and/or encryption module 532 (or a set of instructions). Note that one or more of these program modules (or sets of instructions) may constitute a computer-program mechanism.

During the annotation technique, annotation module 530 may receive a content item 534 (which includes audio information 536 and video information 538) or an optional link 540 to content item 534 from a provider. After accessing content item 534 (which may involve downloading content item 534 at the optional link 540 using communication module 528 and communication interface 512), annotation module 530 may extract audio information 536 from content item 534 and may determine features 542 that characterize audio information 536 by analyzing audio information 536.

Figure 6:
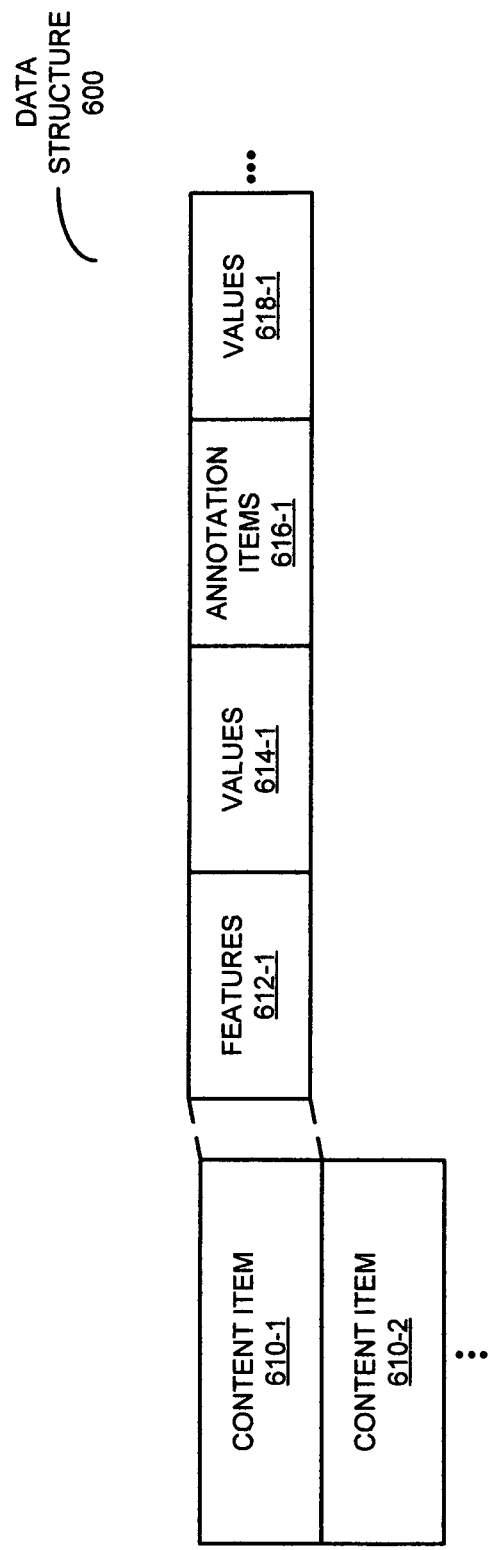
FIG. 6 is a block diagram illustrating a data structure for use with the computer system of FIG. 5 in accordance with an embodiment of the present disclosure.

Next, annotation module 530 may determine annotation items 544 (which may be a predefined set of annotation items that are used to describe content items) associated with video information 538 (and content item 534) based on features 542. For example, annotation items 544 may be determined from features 542 using one or more supervised learning models 546. FIG. 6 presents a block diagram illustrating a data structure 600 with features 612 and annotation items 616 for content items 610. In particular, data structure 600 may include values 614 for features 612 and values 618 for annotation items 616.

Referring back to FIG. 5, annotation module 530 may optionally provide the determined annotation items 544 to provider 548 of content item 534 using communication module 528 and communication interface 512. As noted previously, this may allow provider 548 of a service (such as an online video sharing website) to better classify content item 534.

In some embodiments, annotation module 530 optionally performs one or more additional actions, such as providing, using communication module 528 and communication interface 512, an optional rating 550 of content item 534 and/or an optional recommendation 552 for one or more of content items 554 based on the determined annotation items 544 and/or features 542. Alternatively or additionally, annotation module 530 optionally performs one or more pre-processing operations prior to extracting audio information 536 and/or determining annotation items 544, such as dividing content item 534 into optional segments 556.

Because information used in the annotation technique may be sensitive in nature, in some embodiments at least some of the data stored in memory 524 and/or at least some of the data communicated using communication module 528 is encrypted or decrypted using encryption module 532.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 410 (FIG. 4) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), server 212 (FIGS. 2 and 4), system 400 (FIG. 4), computer system 500 and/or data structure 600 (FIG. 6) may include fewer components or additional components. Moreover, two or more components may be combined into a single component, and/or a position of one or more components may be changed. In some embodiments, the functionality of electronic device 210 (FIGS. 2 and 4), server 212 (FIGS. 2 and 4), system 400 (FIG. 4) and/or computer system 500 may be implemented more in hardware and less in software, or less in hardware and more in software, as is known in the art.

While the preceding discussion used content items to illustrate the annotation technique, in other embodiments the annotation technique is applied to one or more segments of the content items. Consequently, computer system 500 and/or data structure 600 (FIG. 6) may only store segments of a content item (as opposed to whole content item 534 or one of content items 610 in FIG. 6). Furthermore, annotation module 530 may include techniques to: divide audio information 536 into segments, determine annotation items per segment, determine temporal locations of interest and/or combine annotation items per segment into annotation items for whole video information 538.

In the preceding description, we refer to 'some embodiments.' Note that 'some embodiments' describes a subset of all of the possible embodiments, but does not always specify the same subset of embodiments.

While the determination of the annotation items associated with video information was used as an illustration of the annotation technique, in other embodiments the annotation technique may be applied to a wide variety of types of information, including files or content items that include audio information but no video information, such as music or general/generic audio recordings (e.g., the annotation technique may be used to determine annotation items for a content item that only includes audio information). Alternatively, the annotation technique may be applied to content items that only include visual information.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method, comprising:
    obtaining a plurality of user-provided content items that include respective audio information and video information associated with a type of annotation item;
    training a set of classifiers using the plurality of user-provided content items to determine a relationship between features of the plurality of user-provided content items and the type of annotation item, the set of classifiers configured to identify a customized list of a set of annotation items;
    receiving a content item that includes audio information and video information, the audio information being time synchronized with the video information;
    extracting the audio information from the content item;
    determining an acoustic pattern that characterizes a portion of the audio information by performing audio analysis on the audio information, wherein the acoustic pattern is associated with a temporal location in the audio information;
    determining a corresponding temporal location in the video information based at least in part on the temporal location of the acoustic pattern;
    analyzing a portion of the video information at the corresponding temporal location using the set of classifiers to determine a set of matching vectors, individual matching vectors of the set of matching vectors including weighted annotation items from the customized list of the set of annotation items;
    determining a weighted summation of the weighted annotation items of the set of matching vectors to generate a merged matching vector; and
    selecting an annotation item from the customized list of the set of annotation items from the merged matching vector associated with a highest weight, wherein the annotation item characterizes the video information at the corresponding temporal location.

2. The method of claim 1, wherein the annotation items are determined without analyzing the video information to determine additional features that characterize the video information.

3. The computer-implemented method of claim 1, wherein the computer-implemented method further involves receiving a link to the content item; and wherein receiving the content item involves downloading the content item from the link.

4. The computer-implemented method of claim 1, wherein the acoustic pattern is determined using an unsupervised learning technique.

5. The computer-implemented method of claim 1, wherein determining the annotation item involves calculating weights for a set of pre-defined annotation items using the acoustic pattern as an input to one or more pre-determined supervised learning models that specify relationships between the acoustic pattern and the annotation item.

6. The computer-implemented method of claim 5, wherein a given annotation item is associated with at least one given pre-determined supervised learning model that is used to calculate at least a weight associated with the given annotation item.

7. The computer-implemented method of claim 6, wherein the at least one given pre-determined supervised learning model is used to calculate weights associated with the given annotation item and other annotation items; and
    wherein the computer-implemented method further comprises combining the weights calculated by the one or more pre-determined supervised learning models to obtain the annotation items associated with the video information.

8. The computer-implemented method of claim 1 wherein the computer-implemented method further involves analyzing the video information proximate to the temporal location to determine additional features that characterize the video information; and
    wherein determining the annotation items associated with the video information is further based on the additional features.

9. The computer-implemented method of claim 1, wherein the computer-implemented method further involves providing a recommendation for another content item that includes additional audio information and additional video information based on one of: the annotation item and the acoustic pattern.

10. The computer-implemented method of claim 1, wherein the computer-implemented method further involves providing a rating of the content item based on one of: the annotation item and the acoustic pattern.

11. The computer-implemented method of claim 10, wherein the rating indicates one of: an estimated popularity of the content item, quality of the audio information, quality of the video information, and quality of the content item.

12. The computer-implemented method of claim 1, wherein the method further involves identifying music in the audio information.

13. The computer-implemented method of claim 1, wherein the computer-implemented method further involves dividing the audio information into segments;
    wherein a given segment has associated annotation items; and
    wherein at least some of the associated annotation items are different from each other.

14. The computer-implemented method of claim 13, wherein sets of annotation items are separately determined for the segments using one or more pre-determined supervised learning models that specify relationships between the acoustic pattern and the annotation item; and
    wherein the computer-implemented method further comprises combining the sets of annotation items for the segments to obtain the annotation items.

15. The method of claim 1, wherein retrieving a customized list of a set of annotation items further comprises selecting a subset of a predefined set of annotation items for use in determining the annotation items for the provided content items.

16. The method of claim 15, wherein the predefined set of annotation items comprises at least one of a standard dictionary; public user-contributed annotation items; and private user-contributed annotation items.

17. A non-transitory computer-readable storage medium storing instructions that, when executed by at least one processor, enable a computing device to:
    obtain a plurality of user-provided content items that include respective audio information and video information associated with a type of annotation item;
    train a set of classifiers using the plurality of user-provided content items to determine a relationship between features of the plurality of user-provided content items and the type of annotation item, the set of classifiers configured to identify a customized list of a set of annotation items;

receive a content item that includes audio information and video information, the audio information being time synchronized with the video information;

extract the audio information from the content item;

determine an acoustic pattern that characterizes a portion of the audio information by performing audio analysis on the audio information, wherein the acoustic pattern is associated with a temporal location in the audio information;

determine a corresponding temporal location in the video information based at least in part on the temporal location of the acoustic pattern;

analyze a portion of the video information at the corresponding temporal location using the set of classifiers to determine a set of matching vectors, individual matching vectors of the set of matching vectors including weighted annotation items from the customized list of the set of annotation items;

determine a weighted summation of the weighted annotation items of the set of matching vectors to generate a merged matching vector; and select an annotation item from the customized list of the set of annotation items from the merged matching vector associated with a highest weight, wherein the annotation item characterizes the video information at the corresponding temporal location.

18. The non-transitory computer-readable storage medium of claim 17, wherein the annotation items are determined without analyzing the video information to determine additional features that characterize the video information.

19. The non-transitory computer-readable storage medium of claim 17, wherein determining the annotation item involves calculating weights for a set of pre-defined annotation items using the acoustic pattern as an input to one or more pre-determined supervised learning models that specify relationships between the acoustic pattern and the annotation item.

20. The non-transitory computer-readable storage medium of claim 17, wherein the instructions that, when executed by the at least one processor, further enable the computing device to: divide the audio information into segments, wherein a given segment has associated annotation items; and wherein at least some of the associated annotation items are different from each other.

21. A computer system, comprising:

a processor;

memory including instructions that, when executed by the processor, cause the computing system to:

obtain a plurality of user-provided content items that include respective audio information and video information associated with a type of annotation item;

train a set of classifiers using the plurality of user-provided content items to determine a relationship between features of the plurality of user-provided content items and the type of annotation item, the set of classifiers configured to identify a customized list of a set of annotation items;

receive a content item that includes audio information and video information, the audio information being time synchronized with the video information;

extract the audio information from the content item;

determine an acoustic pattern that characterizes a portion of the audio information by performing audio analysis on the audio information, wherein the acoustic pattern is associated with a temporal location in the audio information;

determine a corresponding temporal location in the video information based at least in part on the temporal location of the acoustic pattern; and analyze a portion of the video information at the corresponding temporal location using the set of classifiers to determine a set of matching vectors, individual matching vectors of the set of matching vectors including weighted annotation items from the customized list of the set of annotation items;

determine a weighted summation of the weighted annotation items of the set of matching vectors to generate a merged matching vector; and select an annotation item from the customized list of the set of annotation items from the merged matching vector associated with a highest weight, wherein the annotation item characterizes the video information at the corresponding temporal location.

* * * * *